United States Patent
Felske et al.

(10) Patent No.: US 7,321,730 B2
(45) Date of Patent: Jan. 22, 2008

(54) METHOD AND APPARATUS FOR THE TRANSMISSION FAULT DETECTION IN AN ACCESS NETWORK

(75) Inventors: Kent Felske, Kanata (CA); Richard Brand, Palo Alto, CA (US); Eric Bernier, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 720 days.

(21) Appl. No.: 10/600,713

(22) Filed: Jun. 23, 2003

(65) Prior Publication Data

US 2004/0156635 A1  Aug. 12, 2004

Related U.S. Application Data

(60) Provisional application No. 60/445,837, filed on Feb. 6, 2003.

(51) Int. Cl.
*H04J 14/00* (2006.01)
*H04B 10/08* (2006.01)
*H04B 10/14* (2006.01)

(52) U.S. Cl. .......................... 398/71; 398/32; 398/58; 398/10; 398/100; 398/99; 398/76; 398/66; 398/198

(58) Field of Classification Search .................. 398/32, 398/100, 71, 99, 10, 76, 66, 58, 30, 198
See application file for complete search history.

(56) References Cited

U.S. PATENT DOCUMENTS 5,285,305 A   2/1994  Cohen et al.
5,815,295 A   9/1998  Darcie et al.
6,288,806 B1  9/2001  Touma et al.
6,504,636 B1* 1/2003  Seto et al. .................... 398/91
2002/0075534 A1  6/2002  Feldman

OTHER PUBLICATIONS

Horak, Ray, "Passive Optical Network (PON), PON is a passive, point-to-multipoint access network based on ATM that uses small, inexpensive, low-power optical splitters", *CommWeb*, pp. 1-4., May 17, 2002.
Hranilovic, Steve, "Signal Constellation Design for Optical Intensity Modulated Channels", *Department of Electrical & Computer Engineering*, University of Toronto, 10 King's College Rd., Toronto, Ontario, M5S 3G4, Canada, 1 page, ISIT 2001, Washington, D.C., Jun. 24-29, 2001.

* cited by examiner

*Primary Examiner*—Jason Chan
*Assistant Examiner*—Wai Lun Leung
(74) *Attorney, Agent, or Firm*—Rothwell, Figg, Ernst & Manbeck, PC

(57) ABSTRACT

An optical network unit (ONU) interconnected by passive optical network (PON) equipment to an optical line terminal (OLT) is identified using secondary modulation of the optical carrier to impress an identifier of the ONU onto the carrier. This resolves a recurring ONU failure mode detection problem caused by failure of a laser driver that causes the ONU to be stuck in an on state.

5 Claims, 5 Drawing Sheets

METHOD AND APPARATUS FOR THE TRANSMISSION FAULT DETECTION IN AN ACCESS NETWORK

CROSS-REFERENCE TO RELATED APPLICATIONS

This application claims the benefit under 35 USC § 119(e) of U.S. Provisional Application 60/445,837, filed Feb. 6, 2003.

MICROFICHE APPENDIX

Not Applicable.

TECHNICAL FIELD

The invention generally relates to optical access networks, and, in particular, to a method and apparatus for detecting transmission faults in an optical access network.

BACKGROUND OF THE INVENTION

The development of optical networking, and technologies for wavelength division multiplexing (WDM) of data onto optical fibers, has provided a high capacity communication network backbone that is capable of supporting high bit rate applications. However, the delivery of data to users at rates required by those high bit rate applications is generally not supported. This is referred to as the "last mile problem". The last mile problem is directed to providing efficiently upgradeable high bandwidth service to residential and small commercial users at a price that makes the services appealing to a wide audience.

Some access networks developed to solve the last mile problem include passive optical network (PON) equipment. The idea is that optical fiber is sparingly used to interconnect a plurality of optical network units (ONUs), each of which supply the data services to a single or a respective subset of subscribers. Further, all-optical or "passive" network equipment, i.e. optical switching, coupling and handling equipment that does not use electronic or other power-consuming devices, is used in access networks because of the cost savings in terms of power consumption, and maintenance.

Today's PON access networks permit data to be transmitted by ONU customer premise equipment over a limited span of optical fiber, to an Optical Line Terminal (OLT), (which is generally a part of a service provider central office (CO)). Access networks typically use two optical wavelength carriers, one for distributing data from the OLTs to the ONUs, and one for returning data from the ONUs to the OLT. Often, the same optical fiber is used for transmission in both directions. In the distribution direction, the OLT can encrypt and address the data so that only an intended one of the ONUs can receive and decrypt it. In the return direction, a mechanism for sharing the medium that reduces a probability of collision is required. Time division multiplexing (TDM) is usually used for this purpose. As will be recognized by those skilled in the art, TDM is a well known technique for time sharing that divides the return wavelength channel into a plurality of timeslots. The OLT allocates the timeslots to respective ONUs in a manner known in the art.

Because of the shared use of the optical fiber, and the absence of electrical signal reception equipment in the access network, a problem can arise with ONU transmission equipment in such a configuration. If one ONU laser lapses into an error state in which it is stuck "on", the optical output of the faulty laser "collides" with transmissions of other ONUs entitled to access to the optical fiber. This results in a complete blockage of data transmission to the OLT. If an ONU laser is stuck in the "on" state, the subscriber network effectively becomes a unidirectional distribution network until the defective ONU is identified and repaired or replaced, because the return data channel is effectively taken down. It has been found that lasers used in ONUs sometimes get "stuck" in an active or "on" state. Since all of the ONUs share the return data channel wavelength, and an ONU laser can lapse into the error state at any time, there is no way to remotely identify the faulty ONU.

Consequently service technicians have to inspect each of the ONUs in the access network until the defective ONU is identified. Throughout this time, the return data channel remains unusable, resulting in inconvenienced customers. Rapid identification of faulty ONUs to permit rapid service is therefore important for maintaining subscriber satisfaction. There therefore remains a need for a method and system for rapidly identifying a faulty ONU in an access network.

SUMMARY OF THE INVENTION

It is therefore an object of the invention to provide a method and system for rapidly identifying a faulty ONU in an access network interconnected by passive optical network (PON) equipment.

Accordingly, a transmitter for an optical network unit (ONU) is provided, the transmitter being adapted to transmit data over a return data channel of an access network in accordance with a predefined time-sharing protocol. The transmitter includes a laser driver for driving a laser of the transmitter to generate an optical carrier, a modulation sub-system for modulating data onto the optical carrier generated by the laser, and a secondary modulation sub-system for impressing an ONU identifier onto the optical carrier. The ONU identifier serves to identify the ONU to a network monitor that monitors the return data channel. The secondary modulation sub-system may include a tone source. The tone produced by the tone source serves as the ONU identifier, and it may be modulated to generate the identifier. The secondary modulation sub-system may be a part of the modulation sub-system, or a separate modulator in series with the modulation sub-system.

Advantageously the secondary modulation can be switched off during a timeslot allotted to the ONU, using timeslot information available at the ONU, and switching means. By switching the secondary modulation off in this interval, a signal quality penalty associated with superposition of the secondary modulation on the primary or data modulation can be avoided.

In accordance with another aspect of the invention, there is provided a system for detecting a fail state in an optical network unit (ONU) of a passive optical network (PON) that includes a plurality of ONUs connected to an optical line terminal (OLT). The system includes a secondary modulation sub-system in each ONU for impressing an ONU identifier onto an optical carrier generated by the respective ONU, and a network monitor for monitoring a time-shared return data channel of the PON. The ONU identifier is, for example, a tone, having a frequency lower than the data modulation rate, or a high frequency tone, having a frequency that is higher than the data modulation rate. The network monitor is adapted to detect the ONU identifier impressed on the optical carrier, and to identify the ONU that impressed the ONU identifier on the optical carrier.

The network monitor includes standard optical sampling equipment, such as an optical tap for tapping a small proportion of light from the time-shared return data channel and an optical detector for converting the tapped light to an electrical signal, and well known digital signal reception equipment, such as an amplifier for amplifying the electrical signal, a band pass filter for removing data-frequency components from the electrical signal, and a demodulator and tone detection circuit for processing the digital signal to identify any ONU that impressed an ONU identifier on the return data channel. Preferably the network monitor is further adapted to send a service message to the identified ONU to shut down the ONU, so that it stops colliding with output of the other ONUs. Preferably, the network monitor is also adapted to send a service request message to a service dispatch system, which advises the service dispatch system of the status of the identified ONU, so that it can be promptly repaired.

In accordance with yet another aspect of the invention, there is provided a method for enabling remote transmission fault detection at a optical transmitter for an optical network unit (ONU). The method involves steps of providing the transmitter with an ONU identifier, and impressing the ONU identifier on an optical carrier generated by a laser of the ONU (as a secondary modulation), so that a network monitor can identify the source of the transmission by isolating the ONU identifier impressed on the optical carrier.

In accordance with another aspect of the invention, there is provided an ONU identifier impressed on an optical carrier transmitted by an optical network unit (ONU). The ONU identifier identifies the ONU to a monitoring apparatus so that if a laser of the ONU is transmitting outside of its timeslot, the monitoring apparatus can identify the ONU by isolating the ONU identifier impressed on the optical carrier.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method for identifying an optical network unit (ONU) in a passive optical network (PON) that is in a transmission failure state, such as a laser that is stuck in the "on" state, which interferes with transmissions by other ONUs in the PON.

Figure 1:
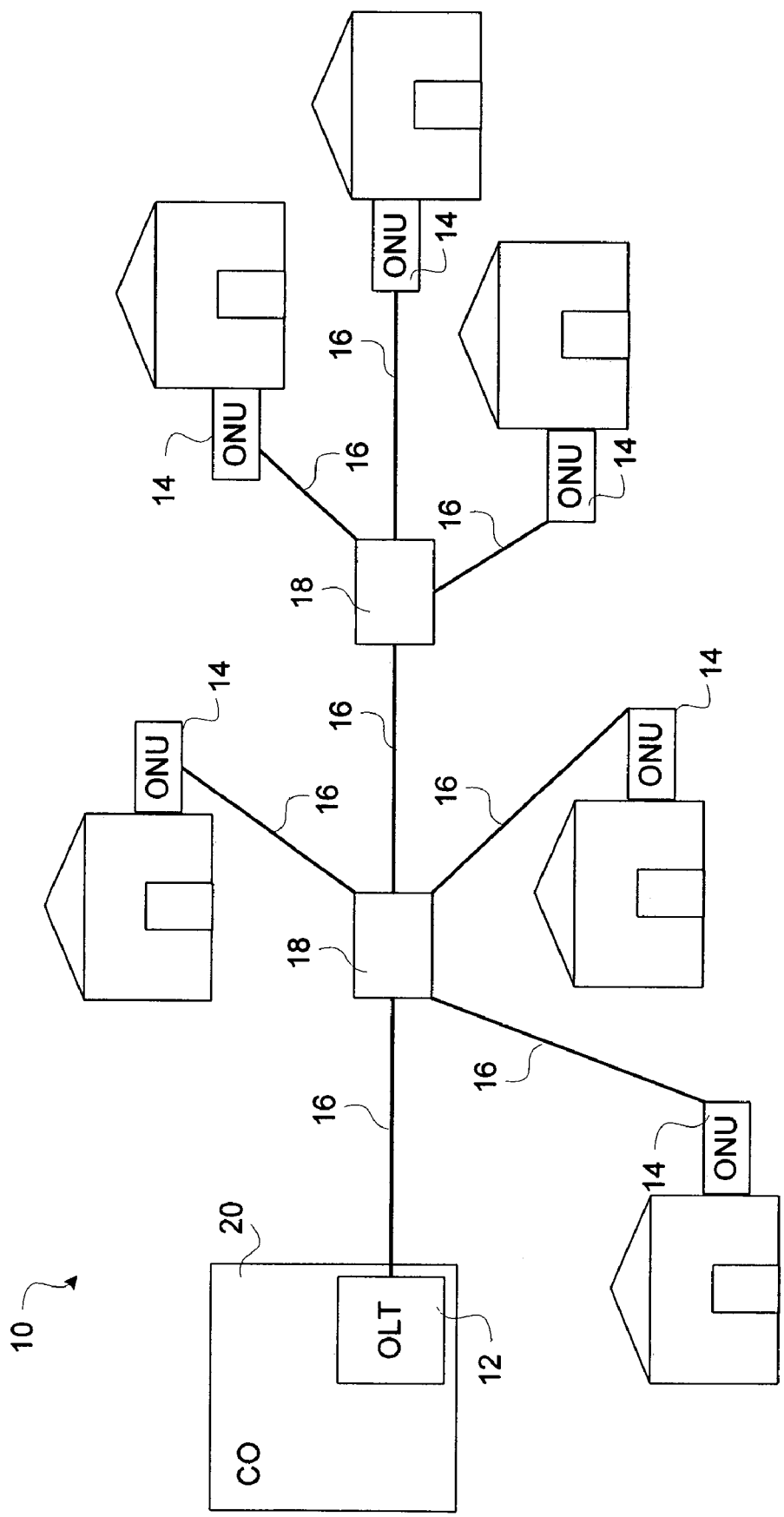
FIG. 1 schematically illustrates a passive optical network (PON) of a known configuration.

As schematically shown in FIG. 1, the topology of a PON 10 is that of a tree structure. The root of the tree structure is the optical line terminal (OLT) 12, from which branches extend to interconnect ONUs 14. The branches are fiber optic links 16 that are connected to passive optical equipment, such as passive optical splitter 18. In the illustrated embodiment, the PON 10 includes 6 ONUs 14, interconnected by 8 fiber optic links and 2 passive optical splitters 18.

Each of the ONUs 14 serves a respective subscriber unit, which may be residential customer premise equipment such as networked computing devices. The connections between the subscriber units and ONUs 14 may be fiber optic links, coaxial cable, or copper wire (twisted pair), or wireless, each of which has been used in prior art communications systems.

As noted above, the OLT 12 may be housed in a central office 20 (CO) of a telephone service provider. In some embodiments a plurality of OLTs may be provisioned in a single CO. Current OLTs are known to provide service to subscribers through up to 32, or more, ONUs.

Each of the ONUs comprises necessary equipment for exchanging data with the subscriber units in one or more formats defined for this purpose. The data may include telephone data, video broadcast service data, computer networking data, etc.

FIG. 2 schematically illustrates an embodiment of a part of an ONU 14 transmission system adapted to conditionally transmit an ONU identifier over the fiber optic link 16. The structure of an ONU is well known to those skilled in the art. The ONU 14 includes equipment (not shown) for data exchange with the subscriber units, means for processing this data and a demodulation system. The transmission system includes a laser and modulation sub-system 30 and a laser driver 32. The laser and modulation sub-system 30 may be of a direct laser modulation type, or an optical carrier output by the laser may be modulated by an external modulator, such as an electro-absorption modulator, to impart the data onto the optical carrier, depending on the specific ONU 14. Both types of ONU lasers may become stuck in an "on" state, a problem that is known in the art.

In accordance with the present invention, timeslot information 33 used for transmission control by the laser driver 32, is further used for switching tone (secondary) modulation on and off. In accordance with the present invention, secondary modulation is understood to be a modulation or dither of the amplitude of an optical carrier that is muted by the primary modulation when the primary modulation sub-system is modulating the laser in its assigned time slot. The ONU 14 is provisioned with means for switching the tone modulation on and off. The tone modulation impresses an identifying signal (ONU identifier) on the optical carrier.

Figure 2A:
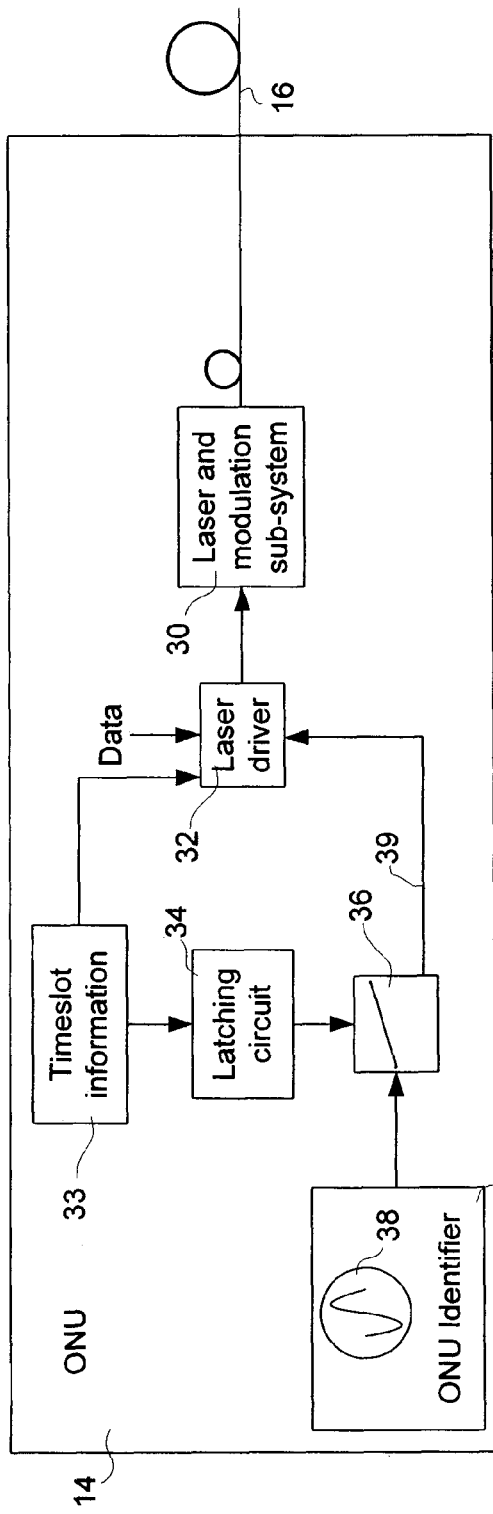
FIG. 2a schematically illustrates a part of a transmitter for conditionally impressing an ONU identifier on an optical carrier output by an ONU laser.
Figure 2B:
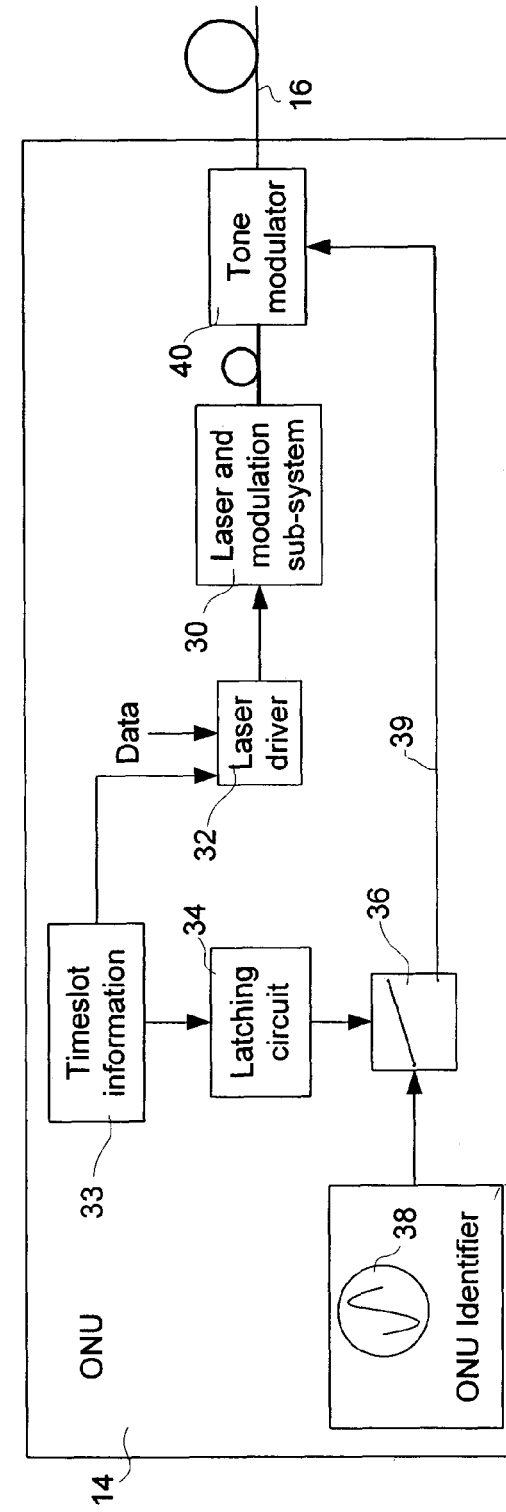
FIG. 2b schematically illustrates a part of another embodiment of a transmitter for conditionally impressing an ONU identifier on an optical carrier output by an ONU laser.

In accordance with the embodiment shown in FIG. 2a, the tone modulation can be switched on and off under the control of a latching circuit 34 that receives the timeslot information 33. The timeslot information 33 is used to determine when the laser driver 32 should be driving the laser to generate the optical carrier on the return data channel. When the timeslot information 33 indicates the beginning or the end of a timeslot allocated to the ONU 14, the latching circuit 34 toggles a switch 36. When a time slot allocated to the ONU 14 ends, the switch 36 is closed and an ONU Identifier 44 (in this example, a tone source 38 that emits a pure tone 39 at a frequency, above or below the data modulation frequency, that is unique to the ONU 14 within the PON 10) is received by a tone modulator 40. Conversely, when the next timeslot allocated to the ONU 14 begins, the switch 36 is opened and the tone 39 is not supplied to the tone modulator 40 for the duration of the timeslot.

As will be understood by those skilled in the art, there are many ways in which the means for switching can be embodied. For example, the switch 36 between the source 38 and the tone modulator 40, may be replaced with means for controlling power to the tone source 38, or means for selectively enabling and disabling the tone modulator 40.

As will further be understood, the switching on and off of the tone modulation in this manner ensures that the secondary modulation only occurs when the ONU 14 is not sending data. Consequently, the ONU Identifier 44 is only impressed on the optical carrier when the ONU 14 is not sending data to the OLT 12.

The secondary modulation sub-system may also be embodied in different ways. For example, it may be a circuit adapted to dither an amplitude of the optical carrier by modifying a current supplied to the laser, as shown in FIG. 2a. It may also be an inexpensive optical modulator 40, as shown in the embodiment shown in FIG. 2b. The amplitude dither causes slight variations in the amplitude of the transmitted optical carrier. Other optical signaling techniques can also be used as the ONU identifier. ONU 14 may be identified to the OLT 12 (FIG. 1) using different signaling techniques, for example, by a unique modulation frequency, a word modulated by the tone modulator 40, a temporal delay between intermittent start and stop times of the secondary modulation, a duration of bursts of the secondary modulation, etc. Furthermore, the ONU identifier can also be used to communicate management or other information from the ONU 14 to the OLT 12.

The ONU identifier need only be unique among the ONUs connected to the PON 10. The ONU identifier may therefore be assigned to the ONU 14 manually or automatically during installation or initialization procedures. A pure low or high frequency tone works well as the ONU identifier, because it meets the functional criteria of being easily differentiated from data transmitted by an ONU that has current access to the return data channel, and it is a cost efficient solution that can be achieved using inexpensive hardware configured in a way that can be readily designed by persons skilled in the art.

In accordance with other embodiments of the invention, the ONU identifier may be impressed on the optical carrier whenever it is generated including during the timeslots allocated to the ONU 14. In such embodiments, the ONU identifier is impressed on the optical carrier while the ONU 14 transmits, and a bounded penalty is incurred because the dither periodically affects the amplitude of the modulated signal. An advantage of this embodiment is that it permits an OLT 12 to identify an ONU 14 that has failed because of a laser driver 37 stuck in an off-state, by detecting a conspicuous absence of the ONU's identifier for a predetermined period of time.

In these embodiments, if one of the laser drivers 32 fails in the on-state, two ONU identifiers will be present on the return data channel at the same time. Accordingly, the monitoring apparatus of the OLT 12 must discern which of the two ONU identifiers is associated with the defective ONU, and which is associated with the ONU 14 that has been allocated a current timeslot. A table of the allocated timeslots can be used to determine which of the two identifiers is associated with a faulty ONU 14. Alternatively, persistence of an ONU identifier for a predetermined period of time may be used to identify the faulty ONU 14. The secondary modulation frequencies should be selected to ensure that superposition of two ONU identifiers does not impair the detection or identification of either ONU identifier.

Figure 3B:
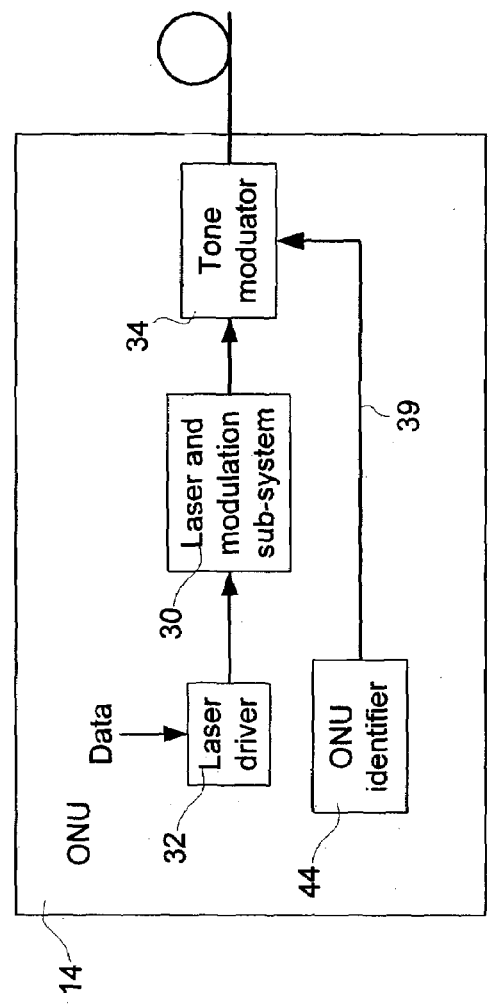
FIGS. 3a, b schematically illustrate two transmitters for impressing the ONU identifier on an optical output, in accordance with embodiments of the invention.
Figure 3A:
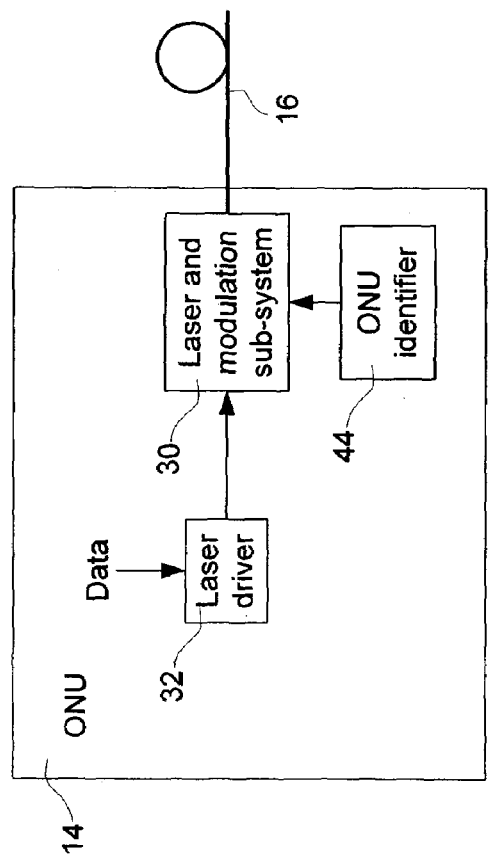

FIG. 3a schematically illustrates an embodiment of the invention in which the primary laser and modulation sub-system 30 is used to provide the secondary modulation to impress the ONU identifier 44 on the optical carrier. The ONU identifier 44 may be, provided by manually setting a plurality of dip switches, or by storing parameters in a non-volatile memory, for example. In operation the laser and modulation sub-system 30 impresses the ONU identifier 44 on the optical carrier using techniques that are known in the art.

FIG. 3b illustrates another embodiment of the invention in which an optical modulator 34 applies continuous secondary modulation to impress the ONU identifier 44 on the optical carrier.

Figure 4A:
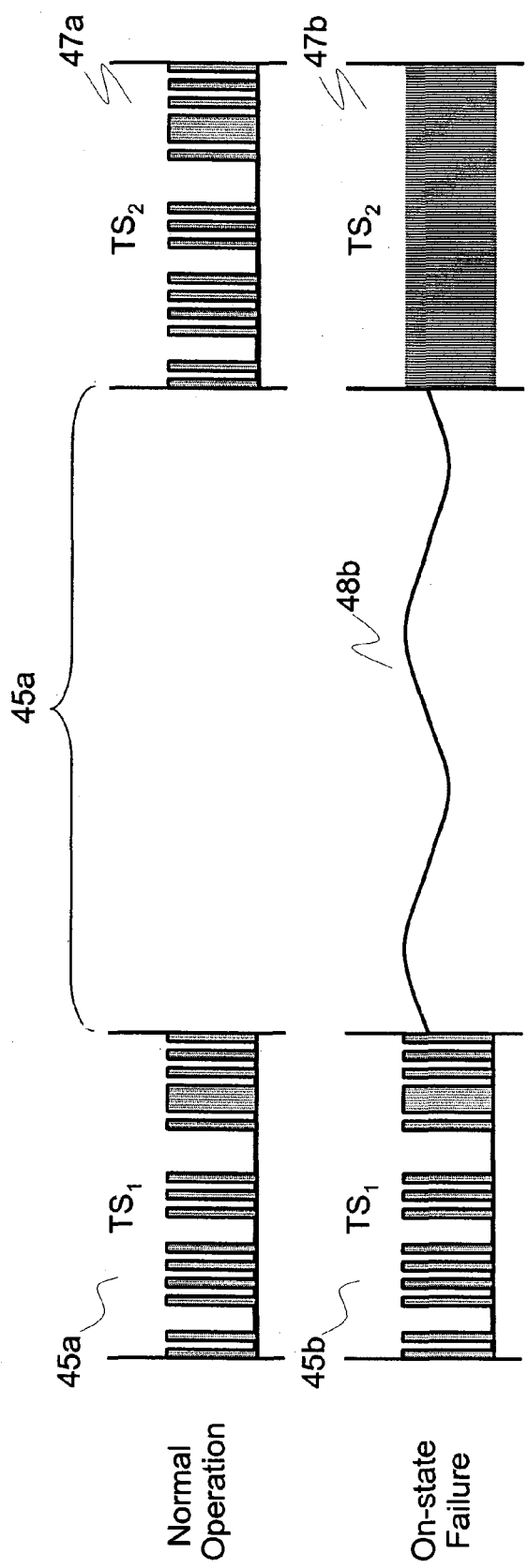
FIGS. 4a, b are timing diagrams schematically illustrating normal and failure mode operation of the ONUs, in accordance with the embodiments of FIGS. 2, 3a and 3b, respectively.

FIG. 4a schematically illustrates normal operation and on-state failure modes of the embodiment of the invention wherein the ONU identifier 44 is not impressed on the, optical carrier during the ONU's 14 timeslot. Two consecutive timeslots 45a-d, 47a-d ($TS_1$ and $TS_2$) allotted to the ONU 14 are shown, separated by an interim period 46 representing time slots allocated to other ONUs 14. It will be apparent to those skilled in the art that in the interim period 46, each of the other ONUs 14 has at least one timeslot during which it sends data to the OLT 12.

During the timeslots 45a, 47a (normal operation) data is transmitted by the ONU 14. This transmission ends at the end of the timeslot 45, and therefore the ONUs' transmissions do not overlap temporally (i.e. collide). Consequently, ONU 14 does not transmit any data or generate an optical carrier during the interim period 46.

As schematically illustrated, an ONU 14 may lapse into an on-state failure. When this occurs data may be transmitted correctly during a timeslot 45b ($TS_1$), but at the end of $TS_1$, the laser fails in the on state. At the end of $TS_1$ (45b), the secondary modulation resumes, and since the laser has failed in the on state, the secondary modulation 48b is impressed on the optical carrier generated by the continuously driven laser output. The ONU identifier 14 is therefore impressed onto the optical carrier throughout the interim period 46. When the next timeslot 47b ($TS_2$) occurs, the secondary modulation is switched off, but the "stuck on" signal continues to be driven high, and may actually be modulated by the primary modulation (not shown). At the end of the $TS_2$ (47b), unless the state of the ONU 14 changes, the secondary modulation is switched on again. It will be appreciated by those of skill in the art that although the secondary modulation 48b is schematically illustrated in isolation, the other ONU 14 are transmitting data in the timeslots between 45b and 47b.

Figure 4B:
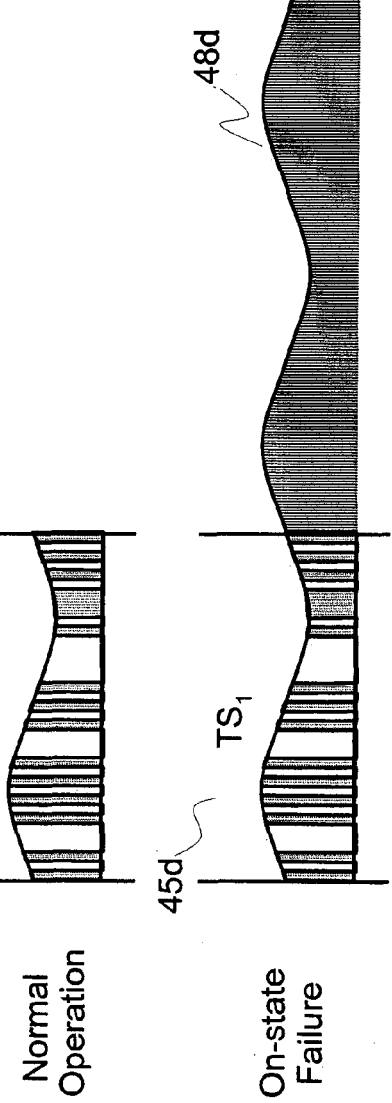

FIG. 4b schematically illustrates normal operation and on-state failure modes of the other embodiments of the invention, in which the ONU identifier 44 is impressed on the optical carrier whenever the laser is on. It will be evident by comparison with the illustration of FIG. 4a, that in the normal operation, the secondary modulation at the lower frequency is impressed over the primary data modulation. The boundaries of the respective timeslots 45c, 47c are respected, so that during the interim period 46, the return data channel is used only by other ONUs 14. The secondary modulation is, for example, a low intensity dither in accordance with the present embodiment, to minimize the interference with the primary modulation of data.

When in on-state failure, the optical carrier persists after the timeslot 45d has ended. Thus, the ONU identifier is impressed on the optical carrier continuously, even when the primary modulation is inactive. When the next time slot (47d) beings, the primary modulation may or may not resume, depending on the confirmation of the ONU 14. In any event, the secondary modulation continues to be imposed on the optical carrier.

Figures 5, 6:
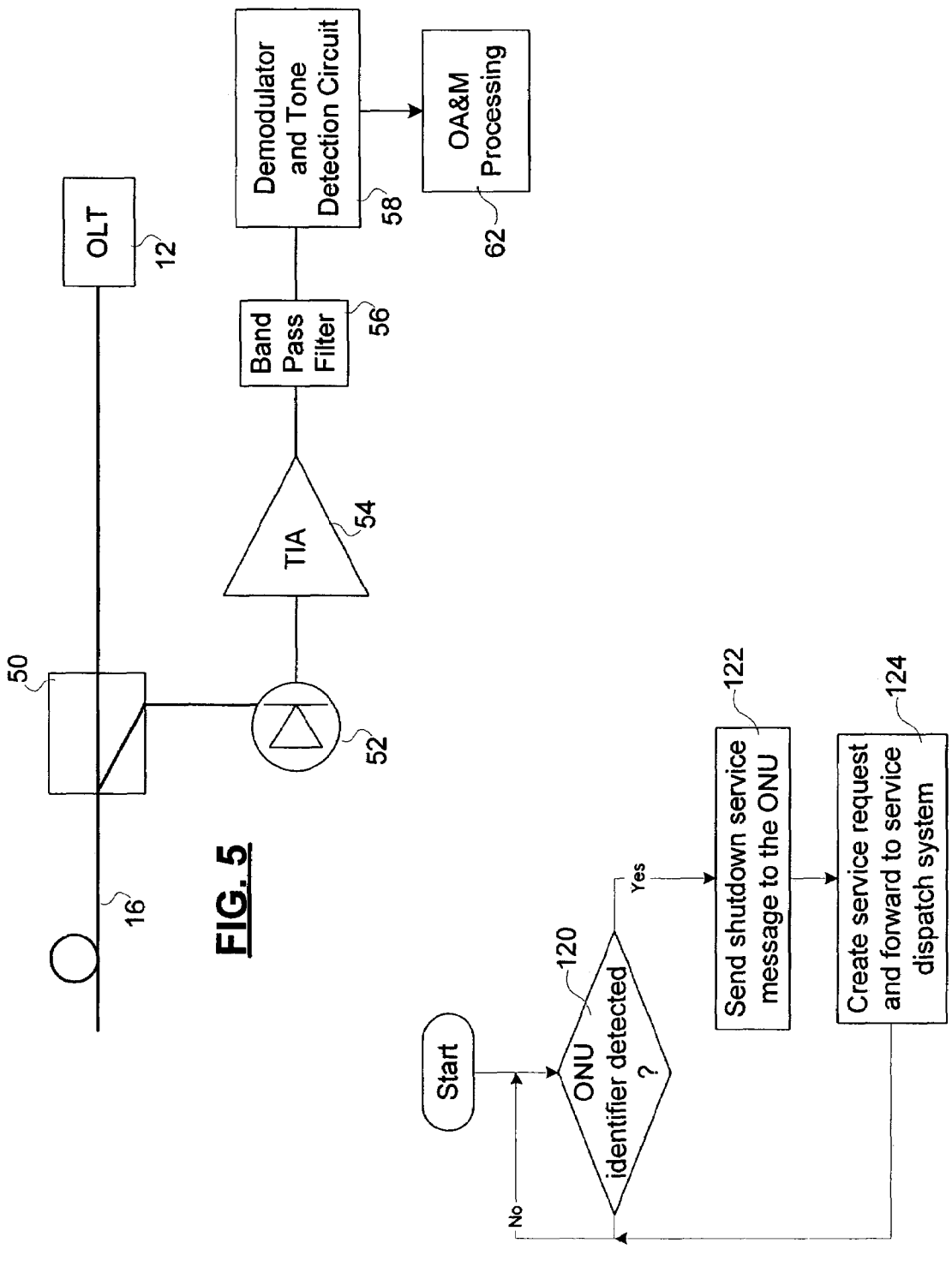
FIG. 5 schematically illustrates an apparatus for monitoring an optical return data channel to detect ONU identifiers.
FIG. 6 illustrates principal steps involved in operations, administration and maintenance processing using the ONU identifiers.

FIG. 5 schematically illustrates a cost-efficient apparatus for monitoring the return data channel and detecting ONU identifiers transmitted over an access network 10, such as the optical network illustrated in FIG. 1. The apparatus for detecting the ONU identifiers may be located anywhere upstream of the optical coupler 18 in the PON 10 (FIG. 1), but is conveniently collocated with the OLT 12.

An optical tap 50, such as a 3-5 percent optical tap on the fiber optic link 16, taps off a small proportion of the light on the return data channel directed to the OLT 12. The tapped-off optical signal is directed to a photodetector 52, which performs an optical-to-electrical conversion of the optical signal. The output of the photodetector 52 is amplified by an amplifier, such as transimpedance amplifier 54, and then passed through a band pass filter 56 that removes any of the high bit rate modulated data on the signal, to isolate ONU identifier frequency components. Unless one of the ONUs 14 is transmitting its ONU Identifier 44, there are substantially no ONU identifier frequency components in the signal. If ONU identifier frequency components are present, they are demodulated by a demodulation and tone detection circuit 58 that applies a comparison operation to identify the ONU 14 associated with the ONU identifier 44. Preferably each ONU identifier 44 can be differentiated by the demodulation and tone detection circuit 58, so that if multiple ONUs 14 happen to fail concurrently, the resulting overlaid ONU identifiers 44 are not mistaken for an identifier of another ONU 14, to permit each of two or more ONUs 14 to be identified if they simultaneously enter a failure state.

When the demodulation and tone detection circuit 58 matches a detected ONU identifier 44 with an ONU 14, it passes that information to an operations, administration and maintenance (OA&M) processing station 62 associated with the OLT 12. An example of how this information is handled is illustrated in FIG. 6. In step 120, it is determined if an ONU Identifier 44 has been detected. If no ONU Identifier 44 has been detected, the procedure reiterates step 120, and otherwise the identified ONU 14 is sent a service message intended to shutdown the ONU 14 (step 122). Such service messages are known in the art. For example, they may be implemented using link level protocol data units exchanged between the OLT 12 and the ONUs 14, in a manner well known in the art. Upon receipt of the service message, the addressed ONU 14 will shutdown its laser and modulation subsystem 30, halting transmission. The subscribers served by the faulty ONU 14 will therefore continue to have their service interrupted, but all of the other ONUs 14 in the PON 10 will be able to resume normal operations.

FIG. 6 illustrates principal steps involved in operations, administration and maintenance processing using the ONU identifiers. In step 124 a service request message is created and forwarded to a service dispatch system. The service request message advises the service dispatch system of the state of the ONU 14. The service dispatch system may then take steps to ensure that the required personnel and equipment are dispatched to the ONU. After the ONU 14 is serviced, service resumes for subscribers served by the repaired ONU 14.

The process shown in FIG. 6 is a continuous monitoring procedure. Consequently, after forwarding the service request message to the service dispatch system in step 124, the procedure returns to step 120.

The embodiments of the invention described above are intended to be exemplary only. The scope of the invention is therefore intended to be limited solely by the scope of the appended claims.

We claim:

1. A transmitter for an optical network unit (ONU) for transmitting data over a return data channel of a passive optical network in accordance with a predefined time-sharing protocol, the transmitter comprising:
   a laser driver for driving a laser of the transmitter to generate an optical carrier;
   a modulation sub-system for modulating data onto the optical carrier generated by the laser; and
   a secondary modulation sub-system for impressing an ONU identifier onto the optical carrier, the ONU identifier serving to identify the ONU to a network monitor that monitors the return data channel, the secondary modulation sub-system comprising a tone source for supplying a tone that serves as the ONU identifier to a tone modulator to modulate the ONU identifier onto the optical carrier; and
   a switch for selectively switching the tone to the tone modulator so that the tone modulator does not impress the ONU identifier onto the optical carrier during a timeslot allocated to the ONU.

2. The transmitter as claimed in claim 1 wherein the tone has a frequency that is well below a data modulation frequency of the primary modulation subsystem.

3. The transmitter as claimed in claim 1 wherein the tone has a frequency that is well above a data modulation frequency of the primary modulation subsystem.

4. The transmitter as claimed in claim 1 wherein the secondary modulation sub-system comprises:
   an ONU identifier source for supplying the ONU identifier to the modulation sub-system to permit the ONU identifier to be modulated onto the optical carrier by the secondary modulation sub-system.

5. The transmitter as claimed in claim 1 further comprising a latching circuit for receiving timeslot information indicating a timeslot allocated to the ONU, and for toggling the switch to switch the tone to the secondary modulation sub-system at respective boundaries of the timeslot.

* * * * *